US010286635B2

(12) United States Patent
Pudleiner et al.

(10) Patent No.: US 10,286,635 B2
(45) Date of Patent: May 14, 2019

(54) MULTI-LAYER FILM WITH IMPROVED MODULUS PROPERTIES

(71) Applicant: Covestro Deutschland AG, Leverkusen (DE)

(72) Inventors: Heinz Pudleiner, Krefeld (DE); Klaus Meyer, Dormagen (DE); Juergen Winkler, Langenfeld (DE); Wolfgang Braeuer, Leverkusen (DE); Joerg Nickel, Dormagen (DE); Craig Pehlert, Lenox, MA (US); Chunhua Li, Cupertino, CA (US); Yan Chen, Cupertino, CA (US)

(73) Assignee: Covestro Deutschland Aktiengesellschaft, Leverkussen (DE)

( * ) Notice: Subject to any disclaimer, the term of this patent is extended or adjusted under 35 U.S.C. 154(b) by 271 days.

(21) Appl. No.: 14/400,363

(22) PCT Filed: May 10, 2013

(86) PCT No.: PCT/EP2013/059701
§ 371 (c)(1),
(2) Date: Nov. 11, 2014

(87) PCT Pub. No.: WO2013/171124
PCT Pub. Date: Nov. 21, 2013

(65) Prior Publication Data
US 2015/0140300 A1 May 21, 2015

(30) Foreign Application Priority Data
May 14, 2012 (WO) .............. PCT/US2012/037745

(51) Int. Cl.
B32B 27/40 (2006.01)
B32B 27/08 (2006.01)
B32B 27/36 (2006.01)
B29C 47/00 (2006.01)
B29C 47/06 (2006.01)
B29C 47/60 (2006.01)
B29C 47/92 (2006.01)
B29C 47/28 (2006.01)

(52) U.S. Cl.
CPC ............ B32B 27/08 (2013.01); B29C 47/004 (2013.01); B29C 47/0021 (2013.01); B29C 47/0054 (2013.01); B29C 47/065 (2013.01); B29C 47/6087 (2013.01); B29C 47/92 (2013.01); B32B 27/36 (2013.01); B32B 27/365 (2013.01); B32B 27/40 (2013.01); B29C 47/28 (2013.01); B29C 2947/92609 (2013.01); B29C 2947/92704 (2013.01); B32B 2250/03 (2013.01); B32B 2250/24 (2013.01); B32B 2250/40 (2013.01); B32B 2307/4026 (2013.01); B32B 2307/412 (2013.01); B32B 2307/536 (2013.01); B32B 2307/54 (2013.01); Y10T 428/24967 (2015.01); Y10T 428/24983 (2015.01)

(58) Field of Classification Search
CPC ............ B32B 2250/03; B32B 2250/24; B32B 2250/40; B32B 2307/4026; B32B 2307/412; B32B 2307/536; B32B 2307/54; B32B 27/08; B32B 27/36; B32B 27/365; B32B 27/40; Y10T 428/24967; Y10T 428/24983
USPC .................................. 428/220, 212
See application file for complete search history.

(56) References Cited

U.S. PATENT DOCUMENTS

| 6,667,101 | B2 | 12/2003 | Silagy | |
| 2002/0146549 | A1* | 10/2002 | Kranenburg-Van Dijk | ................. B32B 27/36 428/217 |
| 2004/0146670 | A1 | 7/2004 | Chin et al. | |
| 2006/0127615 | A1* | 6/2006 | Kikuchi | ................. B29B 11/12 428/35.7 |
| 2007/0087177 | A1* | 4/2007 | Wu | ......... B24B 37/22 428/218 |
| 2008/0230938 | A1 | 9/2008 | Grefenstein et al. | |
| 2009/0130438 | A1 | 5/2009 | Nassi et al. | |

FOREIGN PATENT DOCUMENTS

| DE | 102004014023 A1 | 10/2005 | |
| DE | 102010009230 A1 | 8/2011 | |
| EP | 0359131 * | 9/1989 | ............ B29C 49/22 |
| JP | 2011079284 | 4/2011 | |
| RU | 2201944 C2 | 4/2003 | |
| RU | 2008137623 A | 3/2010 | |
| WO | WO-9711106 A1 | 3/1997 | |
| WO | WO-2004041898 A1 | 5/2004 | |

OTHER PUBLICATIONS

International Search Report from corresponding PCT/EP2013/059701, dated Jun. 28, 2013.

* cited by examiner

Primary Examiner — Lawrence D Ferguson
(74) Attorney, Agent, or Firm — Drinker Biddle & Reath LLP

(57) ABSTRACT

The invention relates to a multi-layer, preferably co-extruded, plastic film with improved modulus properties, which is suitable, in particular, for producing three-dimensionally shaped articles.

19 Claims, No Drawings

MULTI-LAYER FILM WITH IMPROVED MODULUS PROPERTIES

CROSS REFERENCE TO RELATED APPLICATIONS

This application is a § 371 National Stage Application of PCT/EP2013/059701, filed May 10, 2013, which claims priority to PCT/US2012/037745, filed May 14, 2012.

BACKGROUND

Field of the Invention

The invention relates to a multi-layer, preferably co-extruded, plastic film with improved modulus properties, which is suitable, in particular, for producing three-dimensionally formed products e.g. by a thermo-forming process.

Description of Related Art

For several applications, in particular medical applications, it is of major interest that three-dimensionally formed articles, which have been obtained by forming a plastic film, are stable in its three-dimensional form in presence of a wet or humidity environment. Additionally, great demands are made of the plastic films, particularly with respect to the tensile modulus thereof, since the formed articles have to exert sufficient tension during the time of its use.

In the past, single-layer films, for example, consisting of a variety of thermoplastic materials have been employed for applications in wet or humidity environment, which, however, have the disadvantage that despite a high tensile modulus prior to the start of the use this tensile modulus falls off greatly during the period of its use, so that frequently the desired success of the use is not obtained as planned and a reworking of the three-dimensionally formed article becomes necessary. Such a reworking is very costly.

In order to avoid this disadvantage, a demand has therefore existed for plastic films for the production three-dimensionally shaped products, with which the distinct drop in the tensile modulus during the period of the use in wet environment can be diminished.

SUMMARY

The object that underlay the present invention accordingly consisted in providing suitable plastic films for the production of three-dimensionally shaped products, with which the distinct drop in the tensile modulus during the period of the its use can be diminished.

Surprisingly, it has been found that a multi-layer, preferably three-layer, plastic film containing a core layer comprising a polycarbonate or copolycarbonate and/or a polyester or copolyester between two layers comprising a thermoplastic polyurethane and/or a polyester or copolyester with special properties eliminates the disadvantages listed above.

DETAILED DESCRIPTION OF A PREFERRED EMBODIMENT

The subject-matter of the present invention is therefore a multi-layer plastic film, characterised in that it has a core layer A containing at least one polycarbonate or copolycarbonate and/or a polyester or copolyester having a glass transition temperature $T_g$ from 80° C. to 200° C., preferably from 80° C. to 170° C., more preferably from 80° C. to 150° C.

and this core layer is located between two outer layers B containing at least one thermoplastic polyurethane and/or polyester or copolyester exhibiting a hardness from 45 Shore D to 85 Shore D.

Glass transition temperatures $T_g$ are determined by means of differential scanning calorimetry (DSC) according to standard DIN EN 61006 at a heating-rate of 20 K/min with definition of $T_g$ as the midpoint temperature (tangent method).

Preferably according to the present invention the core layer A comprises at least one polyester or copolyester, wherein the inherent viscosity of the polyester or copolyester amounts to 0.50 dL/g to 1.20 dL/g and the polyester or copolyester exhibits a glass transition temperature $T_g$ from 80° C. to 150° C.

The inherent viscosity is determined in 60/40 (wt/wt) phenol/tetrachloroethane at a concentration of 0.5 g/100 ml at 25° C.

Preferably according to the present invention the two outer layers B comprise at least one thermoplastic polyurethane exhibiting a hardness from 45 Shore D to 85 Shore D.

In a preferred embodiment of the present invention the multi-layer plastic film has a core layer A containing at least one polyester or copolyester having an inherent viscosity from 0.50 dL/g to 1.20 dL/g and a glass transition temperature $T_g$ from 80° C. to 150° C.

and this core layer A is located between two outer layers B containing at least one thermoplastic polyurethane exhibiting a hardness from 45 Shore D to 85 Shore D.

Suitable and preferred polyester or copolyester for the core layer A are poly- or copolycondensates of terephthalic acid or naphthalene dicarboxylic acid, such as, for example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN).

Suitable and preferred polycarbonates or copolycarbonates for the core layer A are in particular polycarbonates or copolycarbonates with average molecular weights $M_w$ of from 500 to 100,000, preferably from 10,000 to 80,000, particularly preferably from 15,000 to 40,000.

Additionally, blends containing at least one such polycarbonate or copolycarbonate are suitable and preferred for the core layer A. Blends of the abovementioned polycarbonates or copolycarbonates with at least one poly- or copolycondensate of terephthalic acid, in particular at least one such poly- or copolycondensate of terephthalic acid with average molecular weights $M_w$ of from 10,000 to 200,000, preferably from 26,000 to 120,000, are furthermore also suitable and preferred. In particularly preferred embodiments of the invention, the blend is a blend of polycarbonate or copolycarbonate with poly- or copolybutylene terephthalate. Such a blend of polycarbonate or copolycarbonate with poly- or copolybutylene terephthalate can preferably be one with 1 to 90 wt. % of polycarbonate or copolycarbonate and 99 to 10 wt. % of poly- or copolybutylene terephthalate, preferably with 1 to 90 wt. % of polycarbonate and 99 to 10 wt. % of polybutylene terephthalate, the contents adding up to 100 wt. %. Such a blend of polycarbonate or copolycarbonate with poly- or copolybutylene terephthalate can particularly preferably be one with 20 to 85 wt. % of polycarbonate or copolycarbonate and 80 to 15 wt. % of poly- or copolybutylene terephthalate, preferably with 20 to 85 wt. % of polycarbonate and 80 to 15 wt. % of polybutylene terephthalate, the contents adding up to 100 wt. %. Such a blend of polycarbonate or copolycarbonate with poly- or copolybutylene terephthalate can very particularly preferably be one with 35 to 80 wt. % of polycarbonate or copolycarbonate and 65 to 20 wt. % of poly- or copolybutylene terephthalate, preferably with 35 to 80 wt. % of polycarbonate and 65 to 20 wt. % of polybutylene terephthalate, the contents adding up to 100 wt. %.

In preferred embodiments, particularly suitable polycarbonates or copolycarbonates are aromatic polycarbonates or copolycarbonates.

The polycarbonates or copolycarbonates can be linear or branched in a known manner.

The preparation of these polycarbonates can be carried out in a known manner from diphenols, carbonic acid derivatives, optionally chain terminators and optionally branching agents. Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müler, H. Nouvertne', BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula) III)

HO—Z—OH    (III)

wherein Z is an aromatic radical having 6 to 34 C atoms, which can contain one or more optionally substituted aromatic nuclei and aliphatic or cycloaliphatic radicals or alkylaryls or hetero atoms as bridge members.

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particularly preferred dihydroxyaryl compounds are 4,4'-dihydroxydiphenyl, 2,2-bis-(4-hydroxyphenyl)-propane and bis-(4-hydroxyphenyl)-3,3,5-trimethyl-cyclohexane.

A very particularly preferred copolycarbonate can be prepared using 1,1-bis-(4-hydroxyphenyl)-3,3,5-trimethyl-cyclohexane and 2,2-bis-(4-hydroxyphenyl)-propane.

Suitable carbonic acid derivatives can be, for example, phosgene or diaryl carbonates of the general formula (IV)

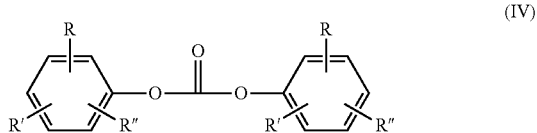

(IV)

wherein

R, R' and R" independently of each another are identical or different and represent hydrogen, linear or branched $C_1$-$C_{34}$-alkyl, $C_7$-$C_{34}$-alkylaryl or $C_6$-$C_{34}$-aryl, and R can furthermore also denote —COO—R''', wherein R''' represents hydrogen, linear or branched $C_1$-$C_{34}$-alkyl, $C_7$-$C_{34}$-alkylaryl or $C_6$-$C_{34}$-aryl.

Particularly preferred diaryl compounds are diphenyl carbonate, 4-tert-butylphenyl phenyl carbonate, di-(4-tert-butylphenyl) carbonate, biphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl] carbonate and di-(methyl salicylate) carbonate.

Diphenyl carbonate is very particularly preferred.

Either one diaryl carbonate or different diaryl carbonates can be used

One or more monohydroxyaryl compound(s) which has/have not been used for the preparation of the diaryl carbonate(s) used can additionally be employed, for example, as chain terminators to control or vary the end groups. These can be those of the general formula (V)

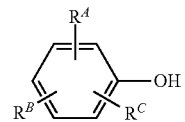

(V)

wherein $R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and $R^B$, $R^C$ independently of each other are identical or different and represent hydrogen, linear or branched $C_1$-$C_{34}$-alkyl, $C_7$-$C_{34}$-alkylaryl or $C_6$-$C_{34}$-aryl.

4-tert-Butylphenol, 4-iso-octylphenol and 3-pentadecylphenol are preferred.

Suitable branching agents can be compounds with three and more functional groups, preferably those with three or more hydroxyl groups.

Preferred branching agents are 3,3-bis-(3-methyl-4-hydroxyphenyl)-2-oxo-2,3-dihydroindole and 1,1,1-tris-(4-hydroxyphenyl)-ethane.

For the core layer A poly- or copolyalkylene terephthalates or poly- or copolyalkylene naphthalates are suitable in preferred embodiments of the invention as poly- or copoly-condensates of terephthalic acid or naphthalene dicarboxylic acid. Suitable poly- or copolyalkylene terephthalates or poly- or copolyalkylene naphthalates are for example reaction products of aromatic dicarboxylic acids or reactive derivatives thereof (for example dimethyl esters or anhydrides) and aliphatic, cycloaliphatic or araliphatic diols and mixtures of these reaction products.

As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester. In one embodiment, the esters are chosen from at least one of the following: methyl, ethyl, propyl, isopropyl, and phenyl esters. In one embodiment, terephthalic acid may be used as the starting material. In another embodiment, dimethyl terephthalate may be used as the starting material.

In another embodiment, mixtures of terephthalic acid and dimethyl terephthalate may be used as the starting material and/or as an intermediate material.

As used herein, the term "naphthalene dicarboxylic acid" is intended to include naphthalene dicarboxylic acid itself and residues thereof as well as any derivative of naphthalene dicarboxylic acid, including its associated acid halides, esters, half-esters, salts, half-salts, anhydrides, mixed anhydrides, or mixtures thereof or residues thereof useful in a reaction process with a diol to make polyester. In one embodiment, the esters are chosen from at least one of the following: methyl, ethyl, propyl, isopropyl, and phenyl esters. In one embodiment, naphthalene dicarboxylic acid may be used as the starting material. In another embodiment, the dimethylester of naphthalene dicarboxylic acid may be used as the starting material. In another embodiment, mixtures of terephthalic acid and the dimethylester of naphthalene dicarboxylic acid may be used as the starting material and/or as an intermediate material.

In addition to terephthalic acid or naphthalene dicarboxylic acid, the dicarboxylic acid component of the poly- or copolyester useful in the invention can optionally comprises up to 30 mole %, preferably up to 20 mole %, more preferably up to 10 mole %, most preferably up to 5 mole % of one or more modifying aromatic dicarboxylic acids. In one preferred embodiment the dicarboxylic acid component of the poly- or copolyester useful in the invention comprise up to 1 mole % of one or more modifying aromatic dicarboxylic acids. Yet in another preferred embodiment the dicarboxylic acid component of the poly- or copolyester useful in the invention comprises 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, preferably from 0.01 to 20 mole %, more preferably from 0.01 to 10 mole %, most preferably from 0.01 to 5 mole % and in a preferred embodiment from 0.01 to 1 mole. In one embodiment, modifying aromatic dicarboxylic acids that may be used in the present invention include but are not limited to those having up to 20 carbon atoms, preferably having 8 to 14 carbon atoms, and which can be linear, para-oriented, or symmetrical. Examples of modifying aromatic dicarboxylic acids which may be used in this invention include, but are not limited to, phthalic acid, isophthalic acid, 4,4'-biphenyldicarboxylic acid, 1,4-, 1,5-, 2,6-, 2,7-naphthalenedicarboxylic acid (in case of poly- or copolyalkylene terephthalates), terephthalic acid (in case of poly- or copolyalkylene naphthalates) and trans-4,4'-stilbenedicarboxylic acid, and esters thereof.

The carboxylic acid component of the copolyesters useful in the invention can optionally be further modified with up to 10 mole %, such as up to 5 mole % or preferably up to 1 mole % of one or more aliphatic dicarboxylic acids containing 2 to 16 carbon atoms, such as, for example, malonic, succinic, glutaric, adipic, pimelic, suberic, azelaic, sebacic, cyclohexane diacetic and dodecanedioic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and preferably from 0.1 to 10 mole %.

Preferred poly- or copolyalkylene terephthalates or poly- or copolyalkylene naphthalates contain at least 70 mole %, preferably at least 80 mole % ethylene glycol, butanediol-1,4,2,2,4,4-tetramethyl-1,3-cyclobutanediol and/or 1,4-cyclohexanedimethanol residues, relative to the diol component.

The preferred poly- or copolyalkylene terephthalates or poly- or copolyalkylene naphthalates can contain in addition to ethylene glycol, butanediol-1,4,2,2,4,4-tetramethyl-1,3-cyclobutanediol and/or 1,4-cyclohexanedimethanol residues up to 30 mole %, preferably up to 20 mole % of other aliphatic diols having 3 to 12 C atoms or cycloaliphatic diols having 6 to 21 C atoms, for example radicals of propanediol-1,3,2-ethylpropanediol-1,3, neopentyl glycol, pentanediol-1,5, hexanediol-1,6, cyclohexane dimethanol-1,4,3-methylpentanediol-2,4,2-methylpentanediol-2,4,2,2,4-trimethylpentanediol-1,3 and 2-ethylhexanediol-1,6,2,2-diethylpropanediol-1,3, hexanediol-2,5,1,4-di-([beta]-hydroxyethoxy)-benzene, 2,2-bis-(4-hydroxycyclohexyl)propane, 2,4-dihydroxy-1,1,3,3-tetramethylcyclobutane, 2,2-bis-(3-[beta]-hydroxyethoxyphenyl)propane and 2,2-bis-(4-hydroxypropoxyphenyl)propane (cf. DE-OS 24 07 674, 24 07 776, 27 15 932).

The poly- or copolyesters of the invention can comprise from 0 to 10 mole %, for example, from 0.01 to 5 mole % based on the total mole percentages of either the diol or diacid residues, respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the poly- or copolyester. The poly- or copolyester(s) useful in the invention can thus be linear or branched. In preferred embodiments the poly- or copolyester(s) useful in the invention are linear and thus do not contain such branching agent.

Examples of branching monomers, if present, include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the copolyester reaction mixture or blended with the copolyester in the form of a concentrate as described, for example, in U.S. Pat. Nos. 5,654,347 and 5,696,176.

Preferred poly- or copolyalkylene terephthalates or poly- or copolyalkylene naphthalates contain at least 70 mole %, preferably 80 mole % terephthalic acid or naphthalene dicarboxylic acid residues, relative to the dicarboxylic acid component, and at least 70 mole %, preferably at least 80 mole % ethylene glycol, butanediol-1,4,2,2,4,4-tetramethyl-1,3-cyclobutanediol and/or 1,4-cyclohexanedimethanol residues, relative to the diol component.

In one particularly preferred embodiment the core layer A comprises at least one copolyester produced solely from terephthalic acid and reactive derivatives thereof (for example dialkyl esters thereof) and ethylene glycol and/or butanediol-1,4.

In another particularly preferred embodiment the core layer A comprises at least one blend of polycarbonate or copolycarbonate with poly- or copolybutylene terephthalate with 1 to 90 wt. % of polycarbonate or copolycarbonate and 99 to 10 wt. % of poly- or copolybutylene terephthalate, preferably with 35 to 80 wt. % of polycarbonate and 65 to 20 wt. % of polybutylene terephthalate, the contents adding up to 100 wt. %.

In another particularly preferred embodiment of the present invention the core layer A comprises at least one copolyester that exhibits residues from
 (a) a dicarboxylic acid component comprising
  i) 70 mole % to 100 mole % terephthalic acid residues,
  ii) 0 mole % to 30 mole % aromatic dicarboxylic acid residues with up to 20 carbon atoms, and
  iii) 0 mole % to 10 mole % aliphatic dicarboxylic acid residues with up to 16 carbon atoms, and
 (b) a diol component comprising
  i) 5 mole % to 50 mole % 2,2,4,4-tetramethyl-1,3-cyclobutanediol residues, and
  ii) 50 mole % to 95 mole % 1,4-cyclohexanedimethanol residues,
wherein the sum of the mole % of residues i)-iii) of the dicarboxylic acid component amounts to 100 mole % and the sum of the mole % of residues i) and ii) of the diol component amounts to 100 mole %.

The two outer layers B preferably comprise at least one thermoplastic polyurethane exhibiting a hardness from 45 Shore D to 85 Shore D.

Particularly preferably such at least one thermoplastic polyurethane is obtainable from
 a) one or more linear polyether diols with mean molecular weights from 500 g/mol to 10,000 g/mol, preferably 500 g/mol to 6000 g/mol, and, on average, in each instance at least 1.8 and at most 3.0, preferably 1.8 to 2.2, Tserevitinov-active hydrogen atoms
 b) one or more organic diisocyanates,
 c) one or more diol chain-extenders with molecular weights from 60 g/mol to 500 g/mol and with, on average, 1.8 to 3.0 Tserevitinov-active hydrogen atoms
 in the presence of
 d) optionally, one or more catalysts
 with addition of
 e) optionally, auxiliary substances and additives,
 wherein the molar ratio of the NCO groups in b) to the groups in a) and c) that are reactive towards isocyanate amounts to 0.85:1 to 1.2:1, preferably 0.9:1 to 1.1:1.

In a particularly preferred embodiment of the present application the multi-layer plastic film is characterised in that
 it has a core layer A containing at least one copolyester that exhibits residues from
  (a) a dicarboxylic acid component comprising
   i) 70 mole % to 100 mole % terephthalic acid residues,
   ii) 0 mole % to 30 mole % aromatic dicarboxylic acid residues with up to 20 carbon atoms, and
   iii) 0 mole % to 10 mole % aliphatic dicarboxylic acid residues with up to 16 carbon atoms, and
  (b) a diol component comprising
   i) 5 mole % to 50 mole % 2,2,4,4-tetramethyl-1,3-cyclobutanediol residues, and
   ii) 50 mole % to 95 mole % 1,4-cyclohexanedimethanol residues,
  wherein the sum of the mole % of residues i)-iii) of the dicarboxylic acid component amounts to 100 mole % and the sum of the mole % of residues i) and ii) of the diol component amounts to 100 mole %
  and wherein the inherent viscosity of the copolyester amounts to 0.50 dL/g to 1.20 dL/g and the copolyester exhibits a glass transition temperature $T_g$ from 80° C. to 150° C.,
 and this core layer is located between two outer layers B containing at least one thermoplastic polyurethane, the thermoplastic polyurethane exhibiting a hardness from 45 Shore D to 85 Shore D and being obtainable from
  a) one or more linear polyether diols with mean molecular weights from 500 g/mol to 10,000 g/mol, preferably 500 g/mol to 6000 g/mol, and, on average, in each instance at least 1.8 and at most 3.0, preferably 1.8 to 2.2, Tserevitinov-active hydrogen atoms
  b) one or more organic diisocyanates,
  c) one or more diol chain-extenders with molecular weights from 60 g/mol to 500 g/mol and with, on average, 1.8 to 3.0 Tserevitinov-active hydrogen atoms
  in the presence of
  d) optionally, one or more catalysts
  with addition of
  e) optionally, auxiliary substances and additives,
  wherein the molar ratio of the NCO groups in b) to the groups in a) and c) that are reactive towards isocyanate amounts to 0.85:1 to 1.2:1, preferably 0.9:1 to 1.1:1.

The film according to the invention surprisingly exhibits a distinctly smaller drop in the tensile modulus under wet or humidity conditions. Moreover, the three-dimensional shaped articles made from such a film according to the invention are stable in its three-dimensional shape under such conditions.

Thermoplastic polyurethanes (TPU) are mostly constructed from linear polyols (macrodiols) such as polyester diols, polyether diols or polycarbonate diols, organic diisocyanates and short-chain, mostly difunctional, alcohols (chain-extenders). They may be produced continuously or discontinuously. The most well-known production processes are the belt process (GB-A 1,057,018) and the extruder process (DE-A 1 964 834).

The thermoplastic polyurethanes preferably employed in accordance with the invention are reaction products formed from the aforementioned
 a) polyether diols
 b) organic diisocyanates
 c) chain-extenders.

By way of diisocyanates b), use may be made of aromatic, aliphatic, araliphatic, heterocyclic and cycloaliphatic diisocyanates or mixtures of these diisocyanates (cf. HOUBEN-WEYL "Methoden der organischen Chemie", Volume E20 "Makromolekulare Stoffe", Georg Thieme Verlag, Stuttgart, N.Y. 1987, pp 1587-1593 or "Justus Liebigs Annalen der Chemie", 562, pages 75 to 136).

In detail, let the following be mentioned in exemplary manner: aliphatic diisocyanates, such as hexamethylene diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate and also the corresponding isomer mixtures, 4,4'-dicyclohexylmethane diisocyanate, 2,4'-dicyclohexylmethane diisocyanate and 2,2'-dicyclohexylmethane diisocyanate and also the corresponding isomer mixtures, aromatic diisocyanates, such as 2,4-toluylene diisocyanate, mixtures consisting of 2,4-toluylene diisocyanate and 2,6-toluylene diisocyanate, 4,4'-diphenylmethane diisocyanate, 2,4'-diphenylmethane—diisocyanate and 2,2'-diphenylmethane diisocyanate, mixtures consisting of 2,4'-diphenylmethane diisocyanate and 4,4'-diphenylmethane diisocyanate, urethane-modified liquid 4,4'-diphenylmethane diisocyanates and 2,4'-diphenylmethane-diisocyanates, 4,4'-diisocyanatodiphenylethane-(1,2) and 1,5-naphthylene diisocyanate. Use is preferentially made of 1,6-hexamethylene diisocyanate, isophorone diisocyanate, dicyclohexylmethane-4,4'-diisocyanate, diphenylmethane-diisocyanate isomer mixtures with a content of 4,4'-diphenylmethane diisocyanate of more than 96 wt. % and, in particular, 4,4'-diphenylmethane diisocyanate and 1,5-naphthylene diisocyanate. The stated diisocyanates may find application individually or in the form of mixtures with one another. They may also be used together with up to 15 wt. % (calculated with respect to the total quantity of diisocyanate) of a polyisocyanate, for example triphenylmethane-4,4',4"-triisocyanate or polyphenyl-polymethylene polyisocyanates.

In the case of the organic diisocyanate(s) b) it is preferably a question of one or more isocyanate(s) selected from the group containing 4,4'-diphenyl-methane diisocyanate, isophorone diisocyanate, dicyclohexylmethane-4,4'-diisocyanate and 1,6-hexamethylene diisocyanate.

Tserevitinov-active polyether diols a) are those with, on average, at least 1.8 to at most 3.0, preferably 1.8 to 2.2, Tserevitinov-active hydrogen atoms.

Designated as Tserevitinov-active hydrogen atoms are all hydrogen atoms bonded to N, O or S that yield methane by conversion with methylmagnesium halide in accordance with a process discovered by Tserevitinov. The determination takes place after the Tserevitinov reaction, whereby methylmagnesium iodide is converted with the compound to be investigated and reacts with acid hydrogen to form a magnesium salt and the corresponding hydrocarbon. The methane arising is determined by gas-volumetric analysis.

Suitable such polyether diols can be produced by one or more alkylene oxides with 2 to 4 carbon atoms in the alkylene residue being converted with a starter molecule that contains two active hydrogen atoms in bonded form. By way of alkylene oxides, let the following be mentioned, for example: ethylene oxide, 1,2-propylene oxide, epichlorohydrin, 1,2-butylene oxide and 2,3-butylene oxide. The alkylene oxides may be used individually, alternately in succession or as mixtures. By way of starter molecules there enter into consideration, for example: water, amino alcohols, such as N-alkyldiethanolamines, for example N-methyldiethanolamine, and diols such as ethylene glycol, 1,3-propylene glycol, 1,4-butanediol and 1,6-hexanediol. Optionally, mixtures of starter molecules may also be employed. Suitable polyether diols are furthermore the hydroxyl-group-containing polymerisation products of tetrahydrofuran and/or of 1,3-propylene glycol. Trifunctional polyethers in proportions from 0 wt. % to 30 wt. %, relative to the bifunctional polyethers, may also be employed, but at most in such quantity that a product arises that is still thermoplastically workable.

The polyether diols preferentially possess number-average molecular weights $M_n$ from 500 g/mol to 8000 g/mol, particularly preferably 500 g/mol to 6000 g/mol. They may find application both individually and in the form of mixtures with one another.

The number-average molecular weights $M_n$ can be determined with end-group determination, such as determination of hydroxyl numbers according to ASTM D 4274.

Tserevitinov-active chain-extenders c) are so-called chain-extension agents and possess, on average, 1.8 to 3.0 Tserevitinov-active hydrogen atoms and have a number-average molecular weight from 60 g/mol to 500 g/mol. Such agents are understood to be—besides compounds exhibiting amino groups, thiol groups or carboxyl groups—those with two to three, preferably two, hydroxyl groups. Hydroxyl compounds with two to three, preferably two, hydroxyl groups are particularly preferred as chain-extenders.

Employed by way of chain-extension agents are, for example and preferably, diols or diamines with a molecular weight from 60 g/mol to 500 g/mol, preferentially aliphatic diols with 2 to 14 carbon atoms, such as, for example, ethanediol, 1,2-propanediol, 1,3-propanediol, 1,4-butanediol, 2,3-butanediol, 1,5-pentanediol, 1,6-hexanediol, diethylene glycol and dipropylene glycol. Also suitable, however, are diesters of terephthalic acid with glycols with 2 to 4 carbon atoms, for example terephthalic acid-bis-ethylene glycol or terephthalic acid-bis-1,4-butanediol, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, such as isophoronediamine, ethylenediamine, 1,2-propylenediamine, 1,3-propylenediamine, N-methylpropylene-1,3-diamine, N,N'-dimethylethylenediamine, and aromatic diamines, such as 2,4-toluylenediamine, 2,6-toluylenediamine, 3,5-diethyl-2,4-toluylenediamine or 3,5-diethyl-2,6-toluylenediamine or primary mono-, di-, tri- or tetraalkyl-substituted 4,4'-diaminodiphenylmethanes. Particularly preferably, use is made of 1,2-ethylene glycol, 1,2-propanediol, 1,3-propanediol, 1,4-butanediol, 1,6-hexanediol, 1,4-di(β-hydroxyethyl)hydroquinone or 1,4-di(β-hydroxyethyl)bisphenol A by way of chain-extenders. Mixtures of the aforementioned chain-extenders may also be employed. In addition, relatively small quantities of triols may also be added.

The number-average molecular weights $M_n$ can be determined with end-group determination, such as determination of hydroxyl numbers according to ASTM D 4274.

In the case of the diol chain-extender(s) c) it is preferably a question of one or more selected from the group containing 1,4-butanediol, 1,3-propanediol, 1,2-propanediol, 1,2-ethylene glycol, 1,6 hexanediol, 1,4-di(β-hydroxyethyl)hydroquinone and 1,4-di(β-hydroxyethyl)bisphenol A.

Reactive groups towards isocyanate in a) and c) are in particular Tserevitinov-active hydrogen atoms containing groups.

The relative quantities of compounds a) and c) are preferably so chosen that the ratio of the sum of the isocyanate groups in b) to the sum of the Tserevitinov-active hydrogen atoms in a) and c) amounts to 0.85:1 to 1.2:1, particularly preferably 0.9:1 to 1.1:1.

The thermoplastic polyurethanes employed in accordance with the invention may optionally contain catalysts d). Suitable catalysts are the tertiary amines that are known and conventional in accordance with the state of the art, such as, for example, triethylamine, dimethylcyclohexylamine, N-methylmorpholine, N,N'-dimethylpiperazine, 2-(dimethylaminoethoxy)ethanol, diazabicyclo[2,2,2]octane and similar and also, in particular, organic metallic compounds such as titanic acid esters, iron compounds or tin compounds, such as tin diacetate, tin dioctoate, tin dilaurate, or the dialkyltin salts of aliphatic carboxylic acids, such as dibutyltin diacetate or dibutyltin dilaurate or similar. Preferred catalysts are organic metallic compounds, in particular titanic acid esters, iron compounds and tin compounds. The total quantity of catalysts in the thermoplastic polyurethanes amounts, as a rule, to about 0 wt. % to 5 wt. %, preferably 0 wt. % to 2 wt. %, relative to the total weight of the TPU.

The thermoplastic polyurethanes (TPU) employed in accordance with the invention may optionally contain, by way of auxiliary substances and additives e), 0 wt. % up to at most 20 wt. %, preferably 0 wt. % to 10 wt. %, relative to the total weight of the TPU, of the conventional auxiliary substances and additives. Typical auxiliary substances and additives are pigments, dyestuffs, flame retardants, stabilisers against the influences of ageing and weathering, plasticisers, slip additives, mould-release agents, chain terminators, substances acting fungistatically and bacteriostatically and also fillers and mixtures thereof.

By way of such additives, inter alia compounds that are monofunctional in relation to isocyanates may preferably be employed in proportions up to 2 wt. %, relative to the total weight of the thermoplastic polyurethane, as so-called chain terminators or mould-release aids. Suitable are, for example, monoamines such as butylamine and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

Examples of further additives are slip additives, such as fatty-acid esters, the metallic soaps thereof, fatty-acid amides, fatty-acid ester amides and silicone compounds, anti-blocking agents, inhibitors, stabilisers against hydrolysis, light, heat and discoloration, flame retardants, dyestuffs, pigments, inorganic and/or organic fillers, for example polycarbonates, and also plasticisers and reinforcing agents. Reinforcing agents are, in particular, fibrous reinforcing substances such as, for example, inorganic fibres, which are produced in accordance with the state of the art and which may also have been subjected to a sizing material. Further particulars concerning the stated auxiliary substances and additives can be gathered from the specialist literature, for example from the monograph by J. H. Saunders and K. C. Frisch entitled "High Polymers", Volume XVI, Polyurethanes: Chemistry and Technology, Parts 1 and 2, Interscience Publishers 1962 and 1964, from the *Taschenbuch der Kunststoff-Additive* by R. Gächter u. H. Müller (Hanser Verlag Munich 1990) or from DE-A 29 01 774.

The thermoplastic polyurethanes employed in accordance with the invention preferably exhibit a hardness from 50 Shore D to 80 Shore D. The Shore hardness is determined in accordance with DIN EN ISO 868.

The thermoplastic polyurethanes employed in accordance with the invention can be produced continuously in the so-called extruder process, for example in a multiple-shaft extruder, or in the so-called belt process. The metering of the TPU components a), b) and c) can be undertaken simultaneously, i.e. in the one-shot process, or in succession, i.e. by means of a prepolymer process. The prepolymer process is particularly preferred. In this connection the prepolymer may be produced both by charging in batches and continuously in a part of the extruder or in a separate upstream prepolymer unit, for example in a static-mixer reactor, for example a Sulzer mixer.

The preferred polyester or copolyester, in particular copolyester employed in accordance with the invention preferably exhibits a glass transition temperature $T_g$ from 85° C. to 130° C., particularly preferably from 90° C. to 120° C.

The polyester or copolyester, in particular copolyester employed in accordance with the invention preferably exhibits an inherent viscosity from 0.50 dL/g to 0.80 dL/g.

Preferred copolyesters used in the present invention typically can be prepared by the reaction of terephthalic acid and optionally one or more additional difunctional carboxylic acids and/or multifunctional carboxylic acids—hereinafter referred to as dicarboxylic acid component—with at least the two difunctional hydroxyl compounds 2,2,4,4-tetramethyl-1,3-cyclobutanediol and 1,4-cyclohexanedimethanol and optionally additional difunctional hydroxyl compounds and/or multifunctional hydroxyl compounds—hereinafter referred to as diol component. Typically the dicarboxylic acid component can be one or more dicarboxylic acid(s) and the diol compound can be two or more dihydric alcohols/glycols. The dicarboxylic acids and alcohols/glycols preferably react in substantially equal proportions and are incorporated into the copolyester polymer as their corresponding residues. The copolyesters used according to the present invention, therefore, can contain substantially equal molar proportions of acid residues and diol residues.

The term "residue", as used herein, means any organic structure incorporated into a polymer through a polycondensation and/or an esterification reaction from the corresponding monomer.

The dicarboxylic acid residues may be derived from a dicarboxylic acid monomer or its associated acid halides, esters, salts, anhydrides, or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make (co)polyester.

The dicarboxylic acid component in the particularly preferred embodiment comprises 70 to 100 mole % of terephthalic acid residues, preferably 80 to 100 mole % of terephthalic acid residues, more preferably 90 to 100 mole % of terephthalic acid residues, most preferably 95 to 100 mole % of terephthalic acid residues. In a particularly preferred embodiment the dicarboxylic acid component comprises 98 to 100 mole % of terephthalic acid residues. In another particularly preferred embodiment the dicarboxylic acid component comprises 100 mole % of terephthalic acid residues.

The total mole % of the dicarboxylic acid component is 100 mole %.

Esters and/or salts of the modifying dicarboxylic acids may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

The ratio of 2,2,4,4-tetramethyl-1,3-cyclobutanediol residues and 1,4-cyclohexanedimethanol residues from the diol component of the copolyester preferably amounts to 10 mole % to 35 mole % 2,2,4,4-tetramethyl-1,3-cyclobutanediol residues to 65 mole % to 90 mole % 1,4-cyclohexanedimethanol residues, particularly preferably 15 mole % to 35 mole % 2,2,4,4-tetramethyl-1,3-cyclobutanediol residues to 65 mole % to 85 mole % 1,4-cyclohexanedimethanol residues, quite particularly preferably 15 mole % to 30 mole % 2,2,4,4-tetramethyl-1,3-cyclobutanediol residues to 70 mole % to 85 mole % 1,4-cyclohexanedimethanol residues, whereby the sum of the mole % of these two components of the diol component amounts to 100 mole %.

The diol component of the copolyester(s) in the particularly preferred embodiment can contain 25 mole % or less of one or more modifying diols which are not 2,2,4,4-tetramethyl-1,3-cyclobutanediol or 1,4-cyclohexanedimethanol. In one embodiment, the copolyesters useful in the invention may contain 15 mole % or less of one or more modifying diols. In another embodiment, the copolyesters useful in the invention can contain 10 mole % or less of one or more modifying diols. In another embodiment, the copolyesters useful in the invention can contain 5 mole % or less of one or more modifying diols. In another embodiment, the copolyesters useful in the invention can contain 3 mole % or less of one or more modifying diols. In another embodiment, the copolyesters useful in the invention can contain 0 mole % modifying diols. Certain embodiments can also contain 0.01 or more mole %, such as 0.1 or more mole %, 1 or more mole %, 5 or more mole %, or 10 or more mole % of one or more modifying diols. Thus, if present, it is contemplated that the amount of one or more modifying diols can range from any of these preceding endpoint values including, for example, from 0.01 to 15 mole % and preferably from 0.1 to 10 mole %.

Modifying diols useful in the copolyester(s) useful in the invention refer to diols other than 2,2,4,4,-tetramethyl-1,3-cyclobutanediol and 1,4-cyclohexanedimethanol and may contain 2 to 16 carbon atoms. Examples of suitable modifying diols include, but are not limited to, ethylene glycol, 1,2-propanediol, 1,3-propanediol, neopentyl glycol, 1,4-butanediol, 1,5-pentanediol, 1,6-hexanediol, p-xylene glycol or mixtures thereof. Preferred modifying diols, if present, are ethylene glycol, 1,3-propanediol and/or 1,4-butanediol.

Each of the diols 2,2,4,4-tetramethyl-1,3-cyclobutanediol or 1,4-cyclohexanedimethanol may be cis, trans, or a mixture thereof.

For the desired copolyester, the molar ratio of cis/trans 2,2,4,4-tetramethyl-1,3-cyclobutanediol can vary from the pure form of each or mixtures thereof. In certain embodiments, the molar percentages for cis and/or trans 2,2,4,4-tetramethyl-1,3-cyclobutanediol are greater than 50 mole % cis and less than 50 mole % trans; or greater than 55 mole % cis and less than 45 mole % trans; or 30 to 70 mole % cis and 70 to 30 mole % trans; or 40 to 60 mole % cis and 60 to 40 mole % trans; wherein the total sum of the mole percentages for cis- and trans-2,2,4,4-tetramethyl-1,3-cyctobutanediol is equal to 100 mole %.

For the desired copolyester, the molar ratio of 1,4-cyclohexanedimethanol can vary from the pure form of each or mixtures thereof. By using a mixture of cis and trans the molar ratio of cis/trans 1,4-cyclohexanedimethanol can vary within the range of 50/50 to 0/100, for example, between 40/60 to 20/80.

The poly- or copolyester useful in the invention can be made by processes known from the literature such as, for example, by processes in homogenous solution, by transesterfication processes in the melt, and by two phase interfacial processes. Suitable methods include, but are not limited to, the steps of reacting one or more dicarboxylic acids with one or more diols at a temperature of 100° C. to 315° C. at a pressure of 0.13 mbar to 1011 mbar (0.1 to 760 mm Hg) for a time sufficient to form a polyester. See U.S. Pat. No. 3,772,405 or Kunststoff-Handbuch, Vol. VIII, p. 695 ff, Karl-Hanser-Verlag, Munich 1973 for methods of producing (co)polyesters.

Suitable polycarbonates or copolycarbonates useful in the invention are commercially available, for example under the trademark Makrolon® from Bayer MaterialScience AG. Suitable polyesters or copolyesters useful in the invention are also commercially available, for example under the trademark Skygreen from SK Chemical or Tritan™ from Eastman Chemical Company. Suitable thermoplastic polyurethanes useful in the invention are also commercially available, e.g. from Bayer MaterialScience AG.

The plastic film according to the invention preferably exhibits a total thickness from 300 μm to 2000 μm, particularly preferably from 400 μm to 1500 μm, quite particularly preferably from 500 μm to 1200 μm.

In the case of the plastic film according to the invention, in a preferred embodiment it is a question of a three-layer film consisting of the core layer A between the two outer layers B.

This preferred embodiment of the plastic film according to the invention displays an excellent adhesion between the core layer A, particularly preferred the copolyester core layer A, and the outer layers B, particularly preferred the TPU outer layers B. Good adhesion between these layers is particularly advantageous and necessary, since a delamination of the plastic film during its use in a wet or humidity environment is undesirable. Moreover, after the production of three-dimensional shaped articles e.g. by means of thermoforming of the film according to the invention and trimming on the cut edges, the articles have to be ground. Also in the course of this grinding process a delamination of the individual layers is undesirable.

The adhesive force between the core layer A and the outer layers B preferably amounts to more than 0.3 N/mm, preferably more than 0.5 N/mm Adhesive force can be determined in accordance with ASTM D 903 98.

The core layer A of the plastic film according to the invention preferably exhibits a layer thickness from 250 μm to 1600 μm, particularly preferably from 350 μm to 1400 μm, quite particularly preferably from 400 μm to 1000 μm. The outer layers B of the plastic film according to the invention preferably exhibit in each instance a layer thickness from 25 μm to 500 μm, particularly preferably from 30 μm to 300 μm, quite particularly preferably from 50 μm to 200 μm.

For some application e.g. for medical applications it is, inter alia, also desirable that the film for the production of the shaped articles is as inconspicuous as possible during the course of usage. Therefore it is furthermore advantageous if the plastic film is as transparent as possible. This requirement is likewise satisfied by the film according to the invention.

The plastic film according to the invention preferably exhibits a transmission of visible light within the wavelength range from 380 nm to 780 nm of more than 70%, particularly preferably of more than 80%. The transmission can be determined in accordance with ASTM D 1003—for example, with an Ultra Scan XE produced by Hunter Associates Laboratory Inc.

The plastic film according to the invention can be produced by means of co-extrusion or double lamination. Production by means of co-extrusion is preferred.

The production of multi-layer plastic films by means of co-extrusion is known to a person skilled in the art. In this connection, for the respective plastic layers the respective plastics, for example and preferably in the form of granular materials, are fused in a compounding extruder and are extruded into a film via a nozzle.

In the course of the double lamination, firstly two films are produced for the two outer layers B, preferentially by means of extrusion, and the core layer A is produced by running the melt in between these two plastic films.

By reason of their outstanding properties—such as, for example, slight drop in the tensile modulus, stability in its three-dimensional shape and good transparency—the plastic films according to the invention are particularly well suited for the purpose of producing three-dimensionally shaped articles. For the purpose of producing such 3D-shaped articles, shaping into the appropriate shape is effected by means of thermoforming from the plastic films according to the invention, and the latter is subsequently cut and polished.

Therefore, a further object of the present invention is a three-dimensionally shaped article obtained from the multilayered film according to the present invention, in particular by means of thermoforming.

The plastic films according to the invention are particularly well suited for the purpose of producing three-dimensionally shaped articles, in particular for use in medical applications, such as for orthopaedic devices, e.g. orthopaedic supports, dental devices, e.g. dental splints or retainers, or splints, e.g. for stabilizing sprained joints or fractures. Additionally the plastic films according to the invention are particularly well suited for the purpose of producing three-dimensionally shaped articles for non-medical applications, such as photovoltaic or (underfloor) heating applications. Moreover, the plastic films according to the invention could particularly be well suited for bullet-proof glass laminates.

The following Examples serve for exemplary elucidation of the invention and are not to be interpreted as limitation.

Feed Materials

ISOPLAST 2530: commercial aromatic transparent thermoplastic polyurethane for medical applications with a Shore hardness of 82 D according to DIN EN ISO 868 (Lubrizol Corp.)

DESMOPAN DP 9365 D: commercial aromatic transparent thermoplastic polyether polyurethane with a Shore hardness of 65 D according to DIN EN ISO 868 (Bayer MaterialScience AG)

Copolyester I: Copolycondensate of terephthalic acid consisting of 48.4 wt. % terephthalic acid, 11.9 wt. % (23 mole % relative to the diol component) 2,2,4,4-tetramethyl-1,3-cyclobutanediol and 39.7 wt. % (77 mole % relative to the diol component) cyclohexanedimethanol, with an inherent viscosity of 0.72 dl/g (measured in a 1:1 mixture consisting of phenol and tetrachloroethane at 25° C.) (Eastman Chemical), Glass transition temperature 110° C. (determined by DSC)

Copolyester II: Copolycondensate of terephthalic acid consisting of 48.3 wt. % terephthalic acid, 11.7 wt. % (23 mole % relative to the diol component) 2,2,4,4-tetramethyl-1,3-cyclobutanediol and 40.0 wt. % (77 mole % relative to the diol component) cyclohexanedimethanol, with an inherent viscosity of 0.63 dl/g (measured in a 1:1 mixture consisting of phenol and tetrachloroethane at 25° C.), Glass transition temperature 105° C. (determined by DSC)

TEXIN 970U: commercial aromatic transparent thermoplastic polyether polyurethane with a Shore hardness of 70 D according to DIN EN ISO 868 (Bayer MaterialScience AG)

MAKROLON 3108: commercial high viscous amorphous, thermoplastic Bisphenol A-Polycarbonat with a Melt Volume Rate (MVR) of 6 g/10 min according to ISO 1133 at 300° C. and 1.2 kg from Bayer MaterialScience AG; Glass transition temperature 149° C. (determined by DSC)

HYTREL 7246: is a commercial high modulus thermoplastic polyester elastomer grade with nominal Shore hardness according to DIN EN ISO 868 of 72 D from Dupont Company, Wilmington POCAN B 1600: is a commercial thermoplastic butylene terephthalate with a Melt Volume Rate (MVR) of 14 g/10 min according to ISO 1133 at 260° C. and 2.16 kg from Lanxess AG Production of the Layered Structures According to the Invention:

Production of Extruded Films

The film extrusion line that is used for producing the co-extruded film(s) comprises:

an extruder with a screw of 60 mm diameter (D) and with a length of 33 D. The screw exhibits a degassing zone;
a melt pump;
a crosshead;
a flat sheet die with a width of 450 mm;
a three-roll calender with horizontal roller arrangement, the third roller being capable of swivelling about +/−45° in relation to the horizontal;
a roller conveyor;
thickness measurement
a device for bilateral application of protective film;
a take-off device;
a winding machine.

The granular material was conveyed out of the dryer into the feed hopper of the extruder. In the plasticising system constituted by the cylinder/screw of the extruder the melting and conveying of the material took place. From the flat sheet die the melt arrived at the calender. On the calender (consisting of three rolls) the definitive shaping and cooling of the film took place. For the purpose of texturing the surfaces of the film, in this connection two polished chromium rollers (for gloss/gloss surfaces) were employed. Subsequently the film was transported through a take-off, the protective film is applied on both sides, then the winding-up of the film took place.

Example 1 (Not According to the Invention)

With the film extrusion line described above, with a temperature of the main extruder from 240° C. to 260° C. a monolayer film consisting of Copolyester I with a thickness of 760 µm was produced.

Example 2 (Not According to the Invention)

With the same film extrusion line as in Example 1, with a temperature of the main extruder from 220° C. to 240° C. a monolayer film consisting of ISOPLAST 2530 with a thickness of 750 µm was produced.

Example 3 (According to the Invention)

Co-Extrusion of Film

The film extrusion line that is used consists of an extruder with a screw of 105 mm diameter (D) and with a length of 41×D. The screw exhibits a degassing zone;
a co-extruder for applying the top layer with a screw of length 25 D and with a diameter of 35 mm
a crosshead;
a special co-extrusion film die with a width of 1500 mm;
a three-roll calender with horizontal roller arrangement, the third roller being capable of swivelling about +/−45° in relation to the horizontal;
a roller conveyor;
a device for application of protective film on both surfaces;
a take-off device;
winding machine.

The granular material of the base material was supplied to the feed hopper of the main extruder. In the respective plasticising system constituted by cylinder/screw the melting and conveying of the respective material took place. Both material melts were brought together in the co-extrusion nozzle. From the nozzle the melt arrived at the calender. On the roll calender the definitive shaping and cooling of the material take place. For the purpose of structuring the surfaces of the film, in this connection two polished chromium rollers (for gloss/gloss surfaces) were employed. Subsequently the film was transported through a take-off, the protective film is applied on both sides, then the winding-up of the film took place.

With this film extrusion line, with a temperature of the main extruder from 220° C. to 240° C. and with a temperature of the co-extruder from 228° C. to 260° C. three-layer films according to the invention with two smooth, glossy sides with a layer thickness of 800 µm were extruded, the copolyester core layer being 650 µm thick and the thermoplastic polyurethane layer on each side being in each instance 75 µm thick.

Example 4 (According to the Invention)

In the film extrusion line as in Example 3, instead of Copolyester I the more readily flowing Copolyester II was employed for the purpose of producing the three-layer films.

From this, with a temperature of the main extruder from 220° C. to 235° C. and with a temperature of the co-extruder from 227° C. to 260° C. three-layer films according to the invention with two smooth, shiny sides with a layer thickness of 800 µm were extruded, the copolyester core layer being 650 µm thick and the thermoplastic polyurethane layer on each side being in each instance 75 µm thick.

Example 5 (According to the Invention)

In the same film extrusion line as in Example 3, a film according to the invention with one glossy surface and one matt surface was extruded.

In this connection, for the purpose of structuring the two surfaces of the film a polished chromium roller and a structured silicone-rubber roller were employed. Rubber rollers that are used for the structuring of the surface of the film are described in DE 32 28 002 (or in the equivalent U.S. Pat. No. 4,368,240) held by Nauta Roll Corporation.

With a temperature of the main extruder from 220° C. to 235° C. and with a temperature of the co-extruder from 227° C. to 260° C. three-layer films according to the invention with a smooth, glossy side and with a matt side with a layer thickness of 800 µm were extruded, the copolyester core layer being 650 µm thick and the thermoplastic polyurethane layer on each side being in each instance 75 µm thick.

Example 6 (According to the Invention)

In the film extrusion line as in Example 3, instead of Copolyester I the blend of 60% by weight MAKROLON 3108 and 40% by weight POCAN B 1600 for the main extruder and TEXIN 970U for the co extruder were employed for the purpose of producing the three-layer films. The TEXIN 970U forms the outer layers, the MAKROLON/POCAN blend the core layer.

From this, with a temperature of the main extruder from 260° C. to 270° C. and with a temperature of the co-extruder from 210° C. to 230° C. three-layer films according to the invention with two smooth, shiny sides with a layer thickness of 750 µm were extruded, the copolyester core layer being 550 µm thick and the thermoplastic polyurethane layer on each side being in each instance 100 µm thick.

Example 7 (According to the Invention)

In the film extrusion line as in Example 3, instead of Copolyester I the blend of 60% by weight MAKROLON 3108 and 40% by weight POCAN B 1600 for the main extruder and HYTREL 7246 for the co extruder were employed for the purpose of producing the three-layer films. The HYTREL 7246 forms the outer layers, the MAKROLON/POCAN blend the core layer.

From this, with a temperature of the main extruder from 260° C. to 270° C. and with a temperature of the co-extruder from 227° C. to 245° C. three-layer films according to the invention with two smooth, shiny sides with a layer thickness of 750 µm were extruded, the copolyester core layer being 550 µm thick and the thermoplastic polyester elastomer layer on each side being in each instance 100 µm thick.

Example 8 (According to the Invention)

In the film extrusion line as in Example 3, instead of Copolyester I the blend of 60% by weight MAKROLON 3108 and 40% by weight POCAN B 1600 for the main extruder and ISOPLAST 2530 for the co extruder were employed for the purpose of producing the three-layer films. The ISOPLAST 2530 forms the outer layers, the MAKROLON/POCAN blend the core layer.

From this, with a temperature of the main extruder from 260° C. to 270° C. and with a temperature of the co-extruder from 210° C. to 240° C. three-layer films according to the invention with two smooth, shiny sides with a layer thickness of 750 µm were extruded, the copolyester core layer being 550 µm thick and the thermoplastic polyurethane layer on each side being in each instance 100 µm thick.

Example 9

Method for determining the peel strength of the thermoplastic polyurethane (TPU) layer on the copolyester layer of examples 3 to 5
Preparation of the Specimens:
1. Die-cut specimens to 4 inch L×0.76 inch W (10 mm L×19.3 mm W): Die dimension can vary depending on availability (W: 0.75~1 inch, L: minimum 4 inch).
2. Mark on the side of the TPU layer being tested. Flip the sample to the other side. Scratch a line by a sharp cutter at 7 mm from one edge of the specimen.
3. Gently bend the specimen along the cut line while having the tested TPU layer intact.
4. Gently start peeling the TPU layer by pulling the small cut portion away from the cut line.
5. Continue peeling until the peel TPU layer is 13 mm in length. Make sure the TPU layer is peeled uniformly across the whole specimen width.
6. Cut the other end of the specimen to make the total adhered area be 62 mm in length.

Example 10

Determination of the Peel Strength
Method:
The determination of the peel strength was carried out following the model of ASTM D 903 98. The specimens, which were prepared in accordance with the method in Example 6, were stored at 50% relative humidity and 23° C. and subsequently tested under these conditions. The separation rate amounted to 305 mm/min From the calibration curves the mean value between 5 mm and 25 mm was evaluated.

The determination has been carried out at three different positions of the specimen. The following show the calculated average results.

For the bottom layer an average load per unit width of 0.76 N/mm for example 3, 0.79 N/mm for example 4 and 0.97 N/mm for example 5 was measured. For the top layer an average load per unit width of 1.13 N/mm for example 3, 0.60 N/mm for example 4 and 1.10 N/mm for example 5 was measured. The results show that the films according to the invention exhibit an excellent adhesion between the copolyester core layer and the TPU outer layers.

For the three-layered films according to example 6 to 8 the peel strength between the outer layers and the core layer were so high that no separation without damage of the outer layer was possible, so that also these films according to the invention exhibit an excellent adhesion between the core layer and the outer layers.

Example 11

Method for Determination of Tensile Strength

The measure of tensile strength was carried out following the model of ASTM D 638. The tensile tests were carried out on a tensile testing machine of the type ZwickZ020/148385. Use was made of tensile test specimens of type 4. For the purpose of evaluation, the mean value of 5 measurements was drawn upon. The specimens were stored at >48 hours at 50% relative humidity and 23° C. and subsequently tested under these conditions. The speed of testing amounted to 12.7 mm/min, in the course of the determination of Young's modulus (elastic modulus or modulus of elasticity), 1 mm/min.

The determination has been carried out at three different positions of the specimen. The following table show the calculated average results.

Results:

| Example | average yield stress (N/mm$^2$) | average yield strain (%) | average tensile strength (N/mm$^2$) | average elongation at break (%) | average tensile modulus (N/mm$^2$) |
|---|---|---|---|---|---|
| 3 | 36.0 | 6.6 | 54.7 | 168.7 | 1233.0 |
| 4 | 36.3 | 6.3 | 53.5 | 171.6 | 1246.0 |
| 5 | 35.7 | 6.3 | 56.6 | 183.4 | 1249.0 |
| 6 | 32.4 | 4.3 | 40.4 | 128.8 | 1069 |
| 7 | 34.9 | 4.2 | 58.4 | 193.4 | 1202 |
| 8 | 39.6 | 4.2 | 56.4 | 180.2 | 1157 |

The results show that the films according to the invention exhibit an excellent tensile strength and an outstanding tensile modulus.

Example 12

Method for Determining the Stress Relaxation

The stress relaxation has been determined according to a modification of ASTM D790:
- sample dimensions: 51 mm (length)×21.5 mm (width)λ ~0.8 mm (thickness)
- water soaking of the samples at defined temperature (25° C. or 50° C.) before measurement of stress relaxation
- three-point bending with 5% strain
- support span: 16 mm Results:

| Water Temperature (° C.) | Materials | Initial load (N) (t = 0 hour) | Remaining Load (N) (t = 24 hours) | % Remaining Load |
|---|---|---|---|---|
| 25° C. | Example 2 (not according to the invention)) | 45.8 | 17.7 | 39 |
|  | Example 3 (according to the invention) | 25.7 | 18.3 | 71 |
|  | Example 6 (according to the invention) | 45 | 26.9 | 60 |
|  | Example 7 (according to the invention) | 35.5 | 21.4 | 60 |
|  | Example 8 (according to the invention) | 51.1 | 24 | 47 |
| 50° C. | Example 2 (not according to the invention)) | 39.6 | 2.05 | 5 |
|  | Example 3 (according to the invention) | 20.7 | 4.5 | 22 |
|  | Example 6 (according to the invention) | 32.9 | 11 | 33 |
|  | Example 7 (according to the invention) | 27.4 | 11.2 | 41 |
|  | Example 8 (according to the invention) | 39.7 | 6.5 | 16 |

In this connection the values for initial load represent the measured values at the time prior to storage, i.e. at time t=0, and the values for remaining load represent the measured values at the time after 24 h of storage.

The results show that at both storage temperatures the three-layer films according to the invention exhibited a higher remaining load after 24 h storage than the TPU single-layer film from Example 2. In particular for examples 3 and 7 it is the more surprising that—although at both storage temperatures the three-layer film according to the invention exhibited a distinctly lower initial load at the time prior to storage—the force that it was still able to exert after storage after 24 h fell to a considerably slighter extent.

Only the samples consisting of the three-layer films according to the invention exhibit a small drop in the tensile modulus during the storage in the wet environment. In addition, the films according to the invention display an outstanding adhesion between the core layers and the other layers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Multi-layer plastic film, comprising
   a core layer A comprising at least one copolyester that exhibits residues from
   (a) a dicarboxylic acid component comprising
      i) 70 mole % to 100 mole % terephthalic acid residues,
      ii) 0 mole % to 30 mole % aromatic dicarboxylic acid residues with up to 20 carbon atoms, and iii) 0 mole % to 10 mole % aliphatic dicarboxylic acid residues with up to 16 carbon atoms, and
(b) a diol component comprising
  i) 5 mole % to 50 mole % 2,2,4,4-tetramethyl-1,3-cyclobutanediol residues, and
  ii) 50 mole % to 95 mole % 1,4-cyclohexanedimethanol residues,
wherein the sum of the mole % of residues i)-iii) of the dicarboxylic acid component amounts to 100 mole % and the sum of the mole % of residues i) and ii) of the diol component amounts to 100 mole %
and wherein the inherent viscosity of the copolyester amounts to 0.50 dL/g to 1.20 dL/g and the copolyester exhibits a glass transition temperature $T_g$ from 80° C. to 150° C.,
  and wherein said core layer is located between two outer layers B comprising at least one thermoplastic polyurethane, the thermoplastic polyurethane exhibiting a hardness from 45 Shore D to 85 Shore D and being obtainable from
  a) one or more linear polyether diols with mean molecular weights from 500 g/mol to 10,000 g/mol, optionally 500 g/mol to 6000 g/mol, and, on average, in each instance at least 1.8 and at most 3.0, optionally 1.8 to 2.2, Tserevitinov-active hydrogen atoms
  b) one or more organic diisocyanates,
  c) one or more diol chain-extenders with molecular weights from 60 g/mol to 500 g/mol and with, on average, 1.8 to 3.0 Tserevitinov-active hydrogen atoms
  in the presence of
  d) optionally, one or more catalysts
  with addition of
  e) optionally, one or more auxiliary substances and additives,
wherein the molar ratio of the NCO groups in b) to the groups in a) and c) that are reactive towards isocyanate amounts to 0.85:1 to 1.2:1, optionally 0.9:1 to 1.1:1, and
  said core layer A being located between two outer layers B comprising at least one thermoplastic polyurethane exhibiting a hardness from 45 Shore D to 85 Shoe D.

2. Multi-layer plastic film according to claim 1, wherein said core layer A comprises at least one polyester or copolyester having an inherent viscosity from 0.50 dL/g to 1.20 dL/g and a glass transition temperature $T_g$ from 80° C. to 200° C.

3. Multi-layer plastic film according to claim 1, wherein the thermoplastic polyurethane exhibits a hardness from 50 Shore D to 80 Shore D.

4. Multi-layer plastic film according to claim 1, wherein the polyether diol a) used for producing the thermoplastic polyurethane is selected from one or more polyether diols of the group based on 1,4-butanediol units and/or 1,3-propylene glycol units.

5. Multi-layer plastic film according to claim 1, wherein the organic diisocyanate b) used for producing the thermoplastic polyurethane is selected from one or more isocyanates of the group containing 4,4'-diphenylmethane diisocyanate, isophorone diisocyanate, dicyclohexylmethane-4,4'-diisocyanate or 1,6-hexamethylene diisocyanate.

6. Multi-layer plastic film according to claim 1, wherein the diol chain-extender c) used for producing of the thermoplastic polyurethane is selected from one or more chain-extenders of the group containing 1,4-butanediol, 1,3-propanediol, 1,2-propanediol, 1,2-ethylene glycol, 1,6-hexanediol, 1,4-di(β-hydroxyethyl)hydroquinone or 1,4-di(β-hydroxyethyl)bisphenol A.

7. Multi-layer plastic film according to claim 1, wherein the thermoplastic polyurethane was produced in a prepolymer process.

8. Multi-layer plastic film according to claim 1, wherein the diol component of the copolyester comprises 10 mole % to 35 mole % 2,2,4,4-tetramethyl-1,3-cyclobutanediol residues and 65 mole % to 90 mole % 1,4-cyclohexanedimethanol residues, 5 mole % to 35 mole % 2,2,4,4-tetramethyl-1,3-cyclobutanediol residues and 65 mole % to 85 mole % 1,4-cyclohexanedimethanol residues, or optionally 15 mole % to 30 mole % 2,2,4,4-tetramethyl-1,3-cyclobutanediol residues and 70 mole % to 85 mole % 1,4-cyclohexanedimethanol of residues, the sum of the mole % of these two components of the diol component amounting to 100 mole %.

9. Multi-layer plastic film according to claim 1, wherein the residues from the dicarboxylic acid component of the polyester include 95 mole % to 100 mole % terephthalic acid residues.

10. Multi-layer plastic film according to claim 1, wherein the film has been co-extruded.

11. Multi-layer plastic film according to claim 1, comprising a total thickness from 300 μm to 2000 μm, optionally from 400 μm to 1500 μm, or optionally from 500 μm to 1200 μm.

12. Multi-layer plastic film according to claim 1, wherein the core layer A has a layer thickness from 250 μm to 1600 μm, optionally from 350 μm to 1400 μm, or optionally from 400 μm to 1000 μm.

13. Multi-layer plastic film according to claim 1, wherein the outer layers B each have a layer thickness from 25 μm to 500 μm, optionally from 30 μm to 300 μm, or optionally from 50 μm to 200 μm.

14. Multi-layer plastic film according to claim 2, wherein the poly- or copolyester exhibits an inherent viscosity from 0.50 dL/g to 0.80 dL/g.

15. Multi-layer plastic film according to claim 1, wherein the poly- or copolyester exhibits a glass transition temperature $T_g$ from 85° C. to 130° C., optionally from 90° C. to 120° C.

16. Multi-layer plastic film according to claim 1, wherein the outer layers B each have a layer thickness from 30 μm to 300 μm.

17. Multi-layer plastic film according to claim 1, wherein the outer layers B each have a layer thickness from 50 μm to 200 μm.

18. Multi-layer plastic film according to claim 1, wherein the core layer A has a layer thickness from 350 μm to 1400 μm.

19. Multi-layer plastic film according to claim 1, wherein the core layer A has a layer thickness from 400 μm to 1000 μm.

* * * * *